Patented Jan. 19, 1943

2,309,052

UNITED STATES PATENT OFFICE 2,309,052

FISH LINE FLOATING SOLUTION

Frederick R. Elias, Akron, Ohio, assignor to Edward R. Adler, Canton, Ohio

No Drawing. Application May 2, 1941, Serial No. 391,534

10 Claims. (Cl. 106—268)

The invention relates to a solution for increasing the buoyancy of fish lines, and more particularly to a solution which may be applied easily to the line used in fly casting, to cause said line to float on the surface of the water as and when required, and this application is a continuation in part of my copending application Serial No. 357,026, filed September 16, 1940.

Fish line dressings for the purpose of waterproofing the line have been provided in wax or paste form, but their application to any considerable length of line has been tedious and troublesome, and it is difficult to thoroughly and uniformly impregnate a line by an application of such wax or paste. However, such dressings do not function to float the line properly as required for fly fishing.

Such a wax or paste coating is soon considerably worn off as the line runs back and forth through the guides on the casting rod, requiring frequent redressing of the line, and as the line is used in natural waters it picks up dirt and scum from the water which dirt and scum is not thoroughly removed by redressing the line. The result is that the buoyancy or floating property of the line is rapidly impaired.

Moreover, such wax or paste dressings are not adapted for application to the artificial fly itself, so that a special fly floating solution has been used for the fly, which solution is not adapted for application to the fly line.

There are two kinds of fly fishing or casting in both of which a weighted line and light rod are used, and in which an artificial fly lure is attached to the end of a long gut leader attached at its other end to the fly line. One kind of fly casting is known as wet fly casting in which the fly is adapted to sink below the surface of the water. The other kind is known as dry fly casting in which both the line and fly are required to float on the surface of the water. In either case the line and fly are continuously cast onto and withdrawn from the water, during which time the line is constantly being run through the rod guides, so that a floating solution for either line or fly or both must be such as to render the line and fly buoyant for long periods without requiring a new application of the floating solution.

Accordingly, it is an object of the present invention to provide a fly line floating solution which is easy to apply to a substantial length of line and which thoroughly cleans and impregnates the line.

Another object is to provide an improved floating solution for rendering both fly lines and flies used therewith water resistant and buoyant over long periods of use in water, as required in fly casting.

A further object is to provide an improved fly line floating solution which can be applied to wet or dry flies and fly line leaders for floating the same if desired.

I have discovered that a solution consisting of proper proportions of paraffin and cup grease dissolved in a solvent such as carbontetrachloride accomplishes all of the foregoing advantages and provides a more satisfactory line floating material than any prior line dressing or waterproofing material of which I am now aware.

The appropriate proportions of these ingredients are as follows:

| | | |
|---|---|---|
| Carbontetrachloride | gallons | 40 |
| Paraffin | pounds | 10 |
| Cup grease | do | 25 |

The cup grease used is a standard commercial product made up of horse fat, powdered hydrated lime, water, and Texas red oil, preferably in the following approximate proportions by weight:

| | |
|---|---|
| Horse fat | 10 |
| Hydrated lime | 1½ |
| Water | 2¾ |
| Texas red oil (viscosity 300 at 100° F.) | 60 |

In preparing the novel fly line floating solution the cup grease is heated to a temperature of about 100° F. and the paraffin is then added in molten form to the cup grease and these two ingredients are thoroughly mixed together. The mixture is then added slowly to the carbontetrachloride, being stirred constantly until all ingredients are thoroughly mixed Although I prefer to use carbontetrachloride as the solvent, benzol or ether can be substituted therefor with good results.

I also prefer to add about two ounces of oil of Mirbane which increases the cleaning action of the solution and deodorizes the mixture, that is, removes any objectionable odor of the other ingredients.

The improved solution when prepared in this way provides a very effective floating solution which is easily applied to a fly line or a fly lure by dipping the same in the solution, so that the tedious task of applying a wax or paste to a long length of line is eliminated. I have found in actual practice that the improved solution cleans all dirt and scum which is on the line and so thoroughly impregnates a fly line as to instantly float the same on the surface of the water. The solution dries immediately, so that as soon as the line has been dipped it is ready for instant use. I have found also that the line stays clean longer and floats satisfactorily over long periods of time without requiring a new application of the solution.

I have also found that the solution is adapted for application equally well to both the fly line and to wet or dry flies for floating the same, so that a separate fly floating solution is not required in addition to the line floating solution.

Moreover, under certain circumstances in dry fly casting it may be desirable to have the gut leader or a portion of it float, and my improved floating solution is equally well adapted for application to the leader for floating the same.

I claim:

1. A fish line floating solution consisting of paraffin and cup grease dissolved in carbontetrachloride, said cup grease comprising a lime soap dispersed in mineral oil.

2. A fish line floating solution consisting of a mixture of paraffin and cup grease dissolved in carbontetrachloride, and oil of Mirbane, said cup grease comprising a lime soap dispersed in mineral oil.

3. A fish line floating solution consisting of about forty gallons of carbontetrachloride, ten pounds of paraffin, twenty-five pounds of cup grease and two ounces of cleaning and deodorizing oil, said cup grease comprising a lime soap dispersed in mineral oil.

4. A fish line floating solution consisting of about ten pounds of paraffin and about twenty-five pounds of cup grease dissolved in about forty gallons of carbontetrachloride, said cup grease comprising a lime soap dispersed in mineral oil.

5. A fish line floating solution consisting of about ten pounds of paraffin and about twenty-five pounds of cup grease dissolved in about forty gallons of carbontetrachloride, and about two ounces of oil of Mirbane, said cup grease comprising a lime soap dispersed in mineral oil.

6. A fish line floating solution consisting of paraffin and cup grease dissolved in carbontetrachloride, said cup grease being made up of horse fat, hydrated lime, water and mineral oil.

7. A fish line floating solution consisting of about ten pounds of paraffin and about twenty-five pounds of cup grease dissolved in about forty gallons of carbontetrachloride, said cup grease being made up of horse fat, hydrated lime, water and mineral oil.

8. A fish line floating solution consisting of about ten pounds of paraffin and about twenty-five pounds of cup grease dissolved in about forty gallons of carbontetrachloride, said cup grease being made up of substantially ten parts by weight of horse fat, one and one-half parts of powdered hydrated lime, two and three-quarters parts of water and sixty parts of Texas red oil.

9. A fish line floating solution consisting of about ten pounds of paraffin and about twenty-five pounds of cup grease dissolved in a solvent selected from the group consisting of carbontetrachloride and benzol, said cup grease comprising a lime soap dispersed in mineral oil.

10. A fish line floating solution consisting of paraffin and cup grease dissolved in a solvent selected from the group of carbontetrachloride and benzol, said cup grease being made up of substantially ten pounds by weight of horse fat, one and one-half parts of powdered hydrated lime, two and three-quarter parts of water, and sixty parts of Texas red oil.

FREDERICK R. ELIAS.